March 29, 1932. M. KNOBEL 1,851,586
MOTOR
Filed Aug. 21, 1931 2 Sheets-Sheet 1
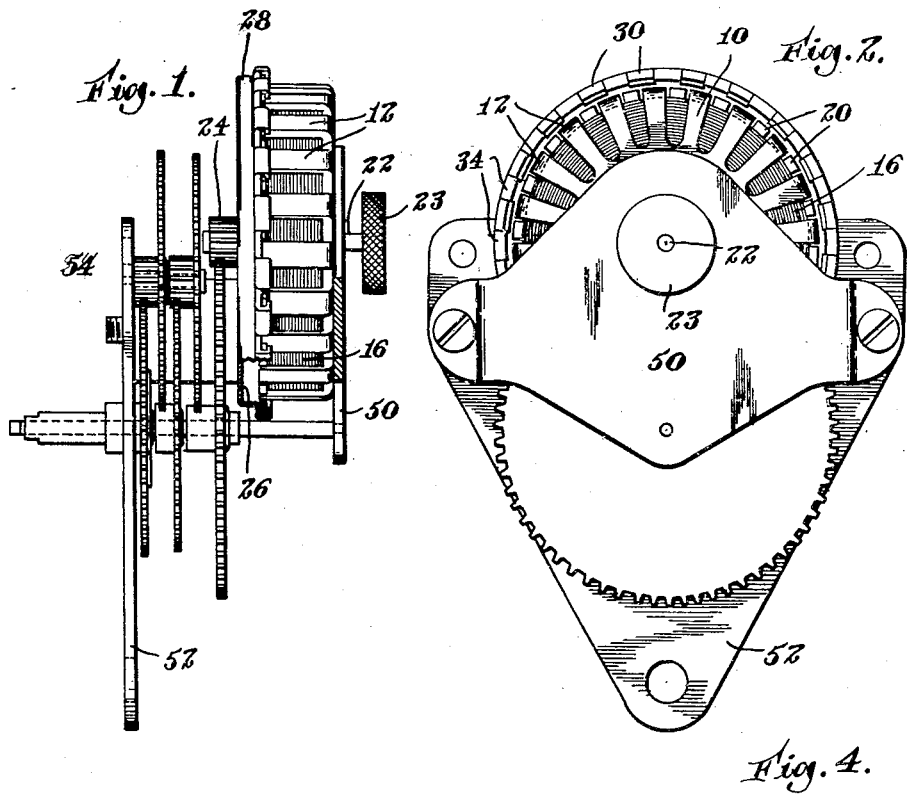
Fig. 1.
Fig. 2.
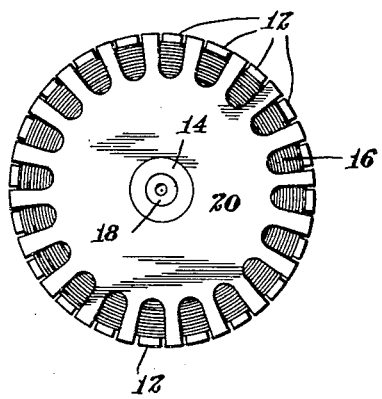
Fig. 3.
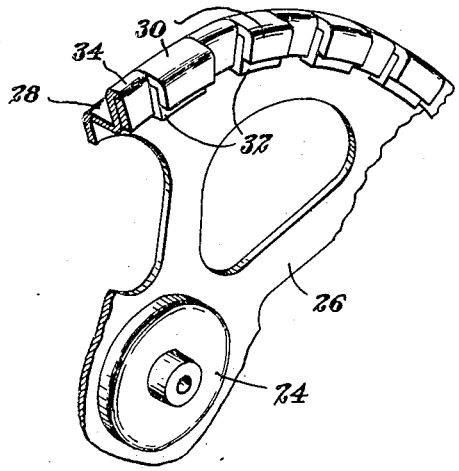
Fig. 4.
Inventor
Max Knobel.
by Kenway & Witter
Attorneys March 29, 1932. M. KNOBEL 1,851,586
MOTOR
Filed Aug. 21, 1931  2 Sheets-Sheet 2
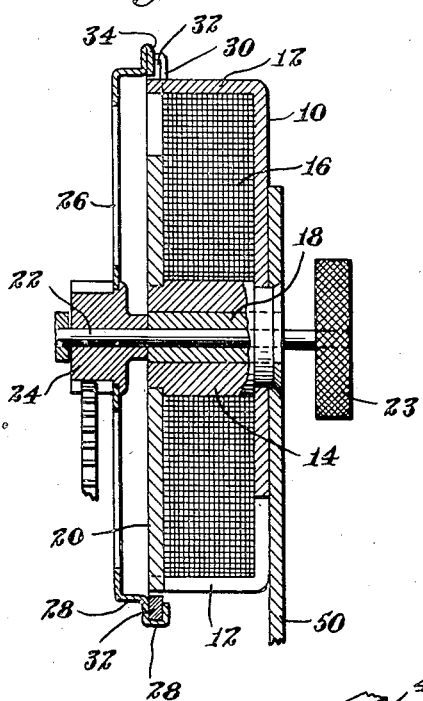
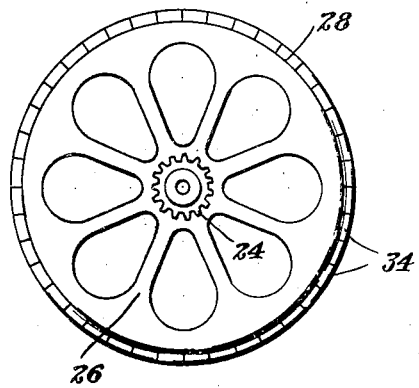
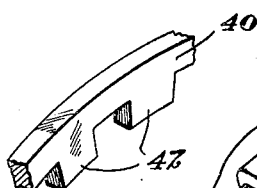
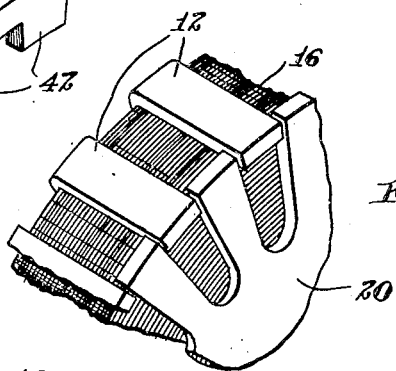
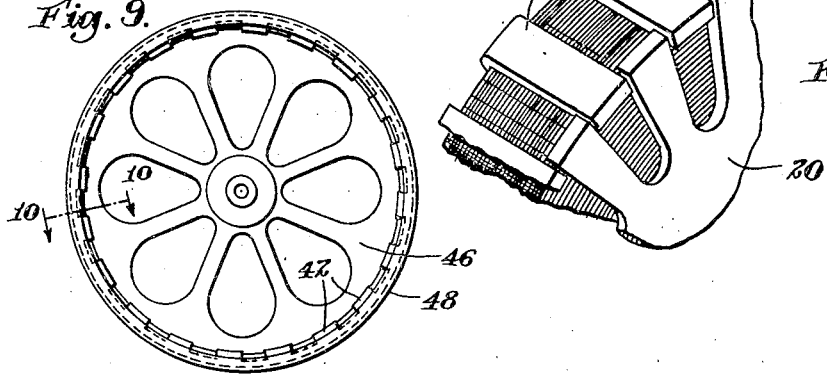
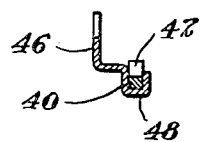
Inventor
Max Knobel
Kenway & Witter
Attorneys Patented Mar. 29, 1932

1,851,586

UNITED STATES PATENT OFFICE

MAX KNOBEL, OF ARLINGTON, MASSACHUSETTS

MOTOR

Application filed August 21, 1931. Serial No. 558,492.

This invention relates to motors of the type employed for operating clocks in synchronism with the cycles of alternating current service.

The general object of my invention is to provide a new and improved rotor for motors of this type. Broadly stated the rotor of my invention comprises a light sheet metal disk having its periphery flanged or otherwise shaped securely to retain in place mechanically defined and spaced permanent magnets. A rotor of this character possesses numerous advantages compared to those heretofore available. In the first place, the mechanical construction thereof may be particularly light, rigid and well balanced so that the rotor is subjected to slight wear in use. In the second place, a high degree of electromagnetic efficiency is secured and the motor may be depended on to develop relatively high torque.

Attempts have been made heretofore to utilize a steel ring of substantially uniform cross-section as the permanent magnet of a rotor. The construction herein disclosed presents distinct advantages over such ring type of magnet in that the distinct magnet members may be more conveniently and permanently magnetized than undefined sections of a ring. There is, moreover, in the ring form of magnet a tendency toward a progression of the poles and also a tendency to become demagnetized which, in a large measure, are obviated by the use of mechanically defined magnets in the manner herein disclosed.

With these objects in view, an important feature of my invention consists in a rotor disk, having a radially slitted rim providing alternate clamping tongues and spacing or positioning lugs for a series of circumferentially arranged permanent magnets. Permanent bar magnets may be conveniently and accurately mounted and secured in place in the rotor by bending alternate tongues so as to clamp the individual magnets and each intermediate tongue may be doubled upon itself to form in effect a solid spacer member which is interposed between consecutive magnets of the series and positively engages their opposed end faces.

These and other features of the invention will be best understood and appreciated from the following description of a preferred embodiment therefrom selected for the purposes of illustration and shown in the accompanying drawings, in which:

Fig. 1 is a view of the assembled motor and clock movement in side elevation;

Fig. 2 is a similar view in rear elevation;

Fig. 3 is a view in rear elevation of the stator of the motor;

Fig. 4 is a view in perspective on an enlarged scale of a portion of the rotor;

Fig. 5 is a central sectional view of the motor;

Fig. 6 is a view in elevation of the rotor;

Fig. 7 is a fragmentary view in perspective and on an enlarged scale of the stator;

Fig. 8 is a fragmentary view in perspective of an alternative rotor magnet;

Fig. 9 is a view in elevation of a rotor in which is incorporated the alternative form of magnet, and Fig. 10 is a sectional view on the line 10—10 of Fig. 9.

The field member or stator of the motor includes a circular sheet iron shell 10 radially slitted and having its non-continuous periphery thus formed flanged at right angles to its body portion thereby presenting a plurality of equally spaced separate pole pieces 12. As will be apparent from inspection of Figs. 1 and 5, each pole piece 12 is L-shaped and has a radial stem extending for slightly more than one-third of the radius of the circular shell 10 and an end portion 12 disposed at substantially right angles thereto with parallel side edges. The shell 10 is provided with a circular hub or core 14 which is rigidly attached thereto and is provided with a bore for the reception of a bushing 18. The core 14 is shouldered at its outer end to receive a cover disk 20 which is thus maintained in spaced relation to the body of the shell 10 and parallel thereto. The cover disk is serrated or slotted about its periphery and has an over all diameter equal to that of the shell 10. The teeth or arms of the cover disk substantially fill the spaces between alternate pole pieces 12 of the shell. The field windings 16 are wound upon the hub or core 14 and are encased within the shell 10 and the cover disk 20.

The motor shaft 22 is journaled in the bushing 18 and has secured to its outer end a flanged hub 24 to which in turn is rigidly secured the rotor. The body of the rotor comprises a sheet metal disk 26 of aluminum alloy or other light metal perforated or cut out for the sake of lightness and this is provided with a flanged rim 28. The rim 28 is equally divided into sections by a series of radial slits. Alternate sections of the rim are bent to form U-shaped clamping tongues 30 and each of these serves to retain in position in the rotor a short bar magnet 32. The intermediate sections 34 of the rim are doubled or folded upon themselves to form solid lugs or spacing members which engage the end faces of the bar magnets 32. It will be seen, therefore, that the rotor presents a circular rim in which are securely mounted a circumferentially arranged series of permanent magnets 32 and these, as will be understood, are arranged with their poles similarly disposed and held positively against peripheral displacement. The inner side of each magnet 32 extends out from under its clamping tongue 30 toward the axis of the rotor and the magnets thus form segments of a non-continuous annular surface.

In Figs. 8, 9, and 10, is illustrated an alternative form of rotor in which is employed a ring 40 having spaced notches in its inner surface which form a series of separate poles 42. In this case the rim 48 of the rotor 46 is flanged or spun over to inclose and hold the ring 40 and the defined poles 42 are magnetized similarly to the separate bar magnets 32 already mentioned.

In Figs. 1 and 2, the motor is shown as supported upon a yoke plate 50 which is secured at either side to the frame 52 of the clock movement, indicated generally by the reference characteristic 54. The hub 24 of the motor shaft is provided with pinion teeth and meshes with one of the main gears of the clock movement for driving the same. The rear end of the motor shaft 22 is provided with a knurled head 23 by which the clock may be set and the motor started.

When an alternating current is permitted to flow in the field windings 16, it will be apparent that the pole pieces 12 of the field will become magnetized and that the polarity of the pole pieces will be reversed with each reversal of the current. The reaction of this characteristic field upon the permanent magnets 32 or 42 of the rotor, which are spaced to correspond to the spacing of the field poles, results in revolving the rotor in definite synchronism with the movement of the field magnetism. For example, if there are twelve pole pieces in the stator and twelve magnets in the rotor, when operated on 60 cycle service the rotor will revolve at a fixed synchronous speed of five revolutions per second.

I have referred herein to mechanically defined permanent magnets and by this term I mean magnets which are set off or marked out geometrically as distinguished from indefinite magnetized areas in a ring of uniform cross-section.

Having thus described my invention what I claim as new and desire to secure by Letters Patent of the United States is:—

1. In a synchronous motor, a rotor comprising a non-magnetic disk having its periphery flanged and doubled over to form a clamping portion and mechanically defined permanent magnets secured in place upon the disk by said clamping portion and forming segments of a non-continuous surface concentric with the axis of the rotor.

2. In a synchronous motor, a rotor comprising a light disk of aluminum alloy having its periphery flanged at right angles to its body and bent over to form a clamping portion and mechanically defined permanent magnets held in place by said clamping portion and projecting inwardly beyond the same toward the axis of the rotor.

3. In a synchronous motor, a rotor comprising a non-magnetic disk having its periphery flanged and slotted to present a series of tongues of substantially equal width, and a permanent bar magnet clamped under each alternate tongue of the series, each intermediate tongue being folded upon itself to form a solid spacing member which is interposed between adjacent magnets.

4. In a synchronous motor, a rotor comprising a non-magnetic disk having its periphery slotted to form a series of tongues, and a permanent magnet clamped under each alternate tongue, the intermediate tongues being bent to engage the end faces of the magnets.

5. A synchronous motor comprising a stator having circumferentially spaced pole pieces, and a rotor comprising a non-magnetic disk with its edge slotted to form tongues spaced to correspond to the spacing of said pole pieces, and a permanent magnet clamped beneath each alternate tongue adjacent to the circle of said pole pieces, the intermediate tongues being interposed between the opposed end faces of said magnets to position them positively circumferentially in the rotor.

MAX KNOBEL.